United States Patent [19]

Masheff et al.

[11] Patent Number: 4,939,510

[45] Date of Patent: Jul. 3, 1990

[54] BROADBAND COMMUNICATIONS RF PACKET COLLISION DETECTION

[75] Inventors: Michael S. Masheff, St. Petersburg; Graig A. Gemmer, Largo, both of Fla.

[73] Assignee: E-Systems, Inc., Dallas, Tex.

[21] Appl. No.: 433,396

[22] Filed: Nov. 7, 1989

Related U.S. Application Data

[63] Continuation of Ser. No. 234,593, Aug. 22, 1988, abandoned.

[51] Int. Cl.⁵ .......................... H04Q 9/00; H04J 6/00
[52] U.S. Cl. ................................. 340/825.5; 370/85.2
[58] Field of Search .......... 340/825.5, 825.51, 825.52; 371/47, 71; 375/51; 370/85.1, 85.2, 85.3, 85.6, 94.1

[56] References Cited

U.S. PATENT DOCUMENTS

| | | |
|---|---|---|
| 4,063,220 | 12/1977 | Metcalfe et al. . |
| 4,259,663 | 3/1981 | Gable ................................ 340/825.5 |
| 4,345,250 | 8/1982 | Jacobsthal ............................ 371/57 |
| 4,380,761 | 4/1983 | Boggs . |
| 4,384,363 | 5/1983 | Lipcon . |
| 4,390,990 | 6/1983 | Ainsworth ....................... 340/825.5 |
| 4,409,593 | 10/1983 | Bose .................................... 375/51 |
| 4,409,959 | 10/1983 | Hunt . |
| 4,432,088 | 2/1984 | Frankel ............................ 340/825.5 |
| 4,464,658 | 8/1984 | Thelen . |
| 4,514,843 | 4/1984 | Albanese . |
| 4,519,074 | 5/1985 | Basile . |
| 4,531,239 | 7/1985 | Usui . |
| 4,532,626 | 7/1985 | Flores et al. . |
| 4,543,574 | 9/1985 | Takagi et al. . |
| 4,560,984 | 12/1985 | Scholl . |
| 4,573,045 | 2/1986 | Galin . |
| 4,584,678 | 4/1986 | Ozeki et al. . |
| 4,608,559 | 8/1986 | Friedman et al. ................ 340/825.5 |
| 4,630,264 | 12/1986 | Wah et al. . |
| 4,639,921 | 1/1987 | Gang et al. . |
| 4,797,901 | 1/1989 | Goerne et al. .................... 340/825.5 |

OTHER PUBLICATIONS

Lathi, B. P., "Modern Digital and Analog Communications Systems", 1983, pp. 224, 245–247.

Primary Examiner—Donald J. Yusko
Assistant Examiner—Eric Oliver Pudpud
Attorney, Agent, or Firm—Harold E. Meier

[57] ABSTRACT

A method and apparatus for identification of packet collisions which occur on a broadband communication bus. The collision detection apparatus is responsive to signals which normally reside on an RF packet channel. This apparatus identifies a collision by splitting a packet signal and then multiplying the split signal by itself utilizing a conventional mixer. The multiplied signal is passed through a bandpass filter and if no packet collision has occurred, then no significant signal energy will appear at the output of the bandpass filter. Howerever, in the event of a packet collision, then the multiplied output signal includes frequency components which pass through the bandpass filter to produce an energy level which is identified in a threshold detector.

8 Claims, 1 Drawing Sheet

BROADBAND COMMUNICATIONS RF PACKET COLLISION DETECTION

This application is a continuation of application Ser. No. 234,593 filed Aug. 22, 1988, now abandoned.

TECHNICAL FIELD

The invention relates generally to communication links carrying digitized packets of information over a timeshared channel and, in particular, to a method and apparatus for detection of packet collisions which occur on a Broadband Communication Bus which receives packets of information from multiple Bus Interface Units.

BACKGROUND OF THE INVENTION

The present invention facilitates the detection of events called packet collisions which occur on a Broadband Communication Bus (BCB) employing RF modulators and demodulators to inject and extract signals onto and off of the bus.

Broadband Communication Buses or Broadband Local Area Networks frequently establish virtual communications links over a timeshared channel. This timeshared channel is commonly called a packet service channel because of the "packetized" nature of the digital information it carries. The electronics located at the nodes where the packets are injected into and extracted from the bus are commonly called bus interface units (BIUs).

The timeshared condition of the packet channel requires a protocol to which all BIUs adhere in order to maximize channel utilization. One well known channel access protocol is called carrier sense multiple access/-collision detection (CSMA/CD). The operation of the protocol is simple. A bus interface unit, when ready to transmit a packet, listens for signals on the bus and, if none are present, begins transmission of the packet. However, due to the finite propagation time delay from one end of the bus to the other, there is a chance that two or more bus interface units will begin transmitting packets simultaneously. This condition results in a packet collision. The collisions, in turn, diminish the throughput capacity of the channel.

Frequency modulation (FM) is normally used for signals being transmitted over the bus. Many of the attributes which make FM a good performing modulation on the BCB also create difficulties when attempting to reliably detect packet collisions. The most widely recognized packet service channel access protocol is defined by the Institute of Electrical and Electronic Engineers (IEEE) in IEEE Standard 802.3 CSMA/CD Access Method and Physical Layer Specifications.

In the proposed IEEE standard, the transmitting BIU compares any data existing on the bus with the data it has transmitted and if there is an error detected, it is presumed to have been due to a packet collision. To inform all bus users of the collision, the BIU of interest then transmits a signal on another channel called the collision enforcement channel. At this point, all BIUs stop transmitting and wait a random period of time before attempting retransmission.

Various disadvantages render the current collision detection technique unattractive. Primarily, the requirement for the BIU to transmit and receive on an adjacent RF channel to institute the collision enforcement channel concept is expensive. BCBs typically have many packet channels; thus, they require an equal number of collision enforcement channels. Additionally, the requirement of a more elaborate method for detecting bit errors means greater expense.

The invention disclosed herein takes advantage of the FM characteristics used for the signals being transmitted over the bus to detect packet collisions. In fact, the only requirement that the collision detection apparatus places on the signals whose collisions are to be detected is that they be FM. The other parameters such as frequency and data rate are unimportant.

The collision detection apparatus is coupled to the BCB and receives signals thereon from a particular channel. If only one signal is present from one transmitting source, the collision detector circuit produces no output signal. If, however, more than one signal is present on the channel, the collision detector generates an output signal which directs the BIU to suspend transmission. Thus, the affected BIUs stop transmitting and wait a random time before attempting retransmission.

This collision detection apparatus includes a first bandpass filter coupled to the data channel for passing only those frequencies which are intended to be present on the BCB and, thus, selects the RF packet channel of interest. This eliminates any interference from adjacent channels. A frequency shifting device is coupled to the output of the first bandpass filter which shifts the frequency of the signals a first amount if only one signal is present and at least a second amount if more than one signal is present. A second bandpass filter receives the frequency shifted output signal and has a bandpass which will prevent the signal shifted a first amount from passing through the filter, but will allow the frequency shifted a second amount to pass through the filter thereby indicating a data collision.

The frequency shifting means may be a signal splitter coupled to the output of the first bandpass filter which generates two substantially similar signals and couples them to a mixer which multiplies the two signals together to generate an output having first shifted frequency components if only one signal is present on the data channel, and second shifted frequency components if at least a second signal is also present on the data channel. As indicated previously, the second bandpass filter has a bandpass which will, in fact, pass at least some of the frequency components generated if two signals are present on the data channel, but will not pass the frequency components generated if only one signal is present on the data channel.

Thus, the invention generally relates to identification of packet collisions which occur on a Broadband Communication Bus.

The invention also relates to collision detection apparatus which is responsive to signals of the type which normally reside on an RF packet channel utilizing FM communication signals.

The invention identifies a collision by splitting the packet signals on a data channel and utilizing the split signals to generate a first frequency output if signals from only one BIU are on the data channel and a second frequency if signals from more than one BIU are on the data channel. The two frequencies are obtained by multiplying the split signal by itself utilizing a conventional multiplier such as a mixer. The multiplied signal is passed through a bandpass filter which is adjusted to pass at least some of the signal components which exist as a result of mixing two or more frequencies on the data channel, but will substantially block the signal components which exist as a result of mixing only one signal from only one BIU on the data channel. Thus, an output signal represents a data collision.

SUMMARY OF THE INVENTION

Thus, the invention is for use in apparatus including multiple data channels and n signal transmitting sources coupled to one of the data channels for transmitting FM data signals $s_1$ through $s_n$, respectively, on the one data channel, the transmitting sources having the possibility of transmitting their respective signals simultaneously and causing unwanted data collisions and is an improved collision detection apparatus including a first bandpass filter tuned to the one data channel to eliminate interference from adjacent channels and for generating output frequency signals representing a frequency spectrum which includes the data frequency from more than one of the n signal transmitting means, means coupled to the first bandpass filter for receiving the output signals and shifting the frequency of the signals a first amount if only one signal, $s_n$, is present on the said one data channel and at least a second amount if more than one signal is present on the said one data channel, and a second bandpass filter for generating a collision detection signal only when the frequency shifted a second amount is present so as to indicate a data collision.

BRIEF DESCRIPTION OF THE DRAWINGS

The present invention will be disclosed in greater detail in conjunction with the accompanying drawings in which like numbers represent like components and in which.

DETAILED DESCRIPTION OF THE DRAWINGS

Figure 1:
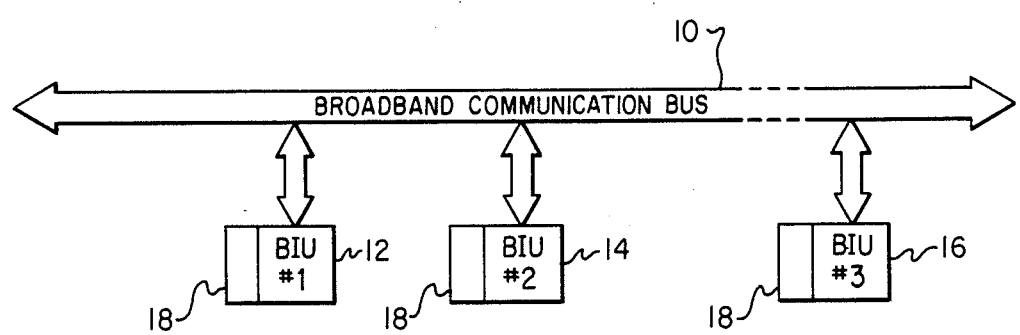
FIG. 1 is a schematic diagram of the collision detectors coupled to a Broadband Communications Bus resident in a plurality of BIUs.

FIG. 1 is a schematic diagram of a Broadband Communication Bus with a plurality of bus interface units connected thereto with integrally formed collision detectors. In FIG. 1, the Broadband Communication Bus 10 may carry a plurality of RF packet data channels thereon. Typically, these signals on each channel are FM signals which may have center frequencies anywhere in the BCB spectrum (from 10 MHz to 500 MHz) and have data rates which vary between 1 Mbps and 20 Mbps. The frequency modulation deviation ratios vary accordingly. The data may also be manchester encoded. The BIUs 12, 14 and 16, represent any particular number, n, of them. These BIUs employ RF modulators and demodulators to inject and extract signals onto and off of the bus 10. Thus, the common channel on bus 10 to which the BIUs are connected is a timeshared channel. It is commonly called a packet service channel because of the "packetized" nature of the digital information it carries. Since the packet channel is timeshared, a protocol is required to which all of the BIUs 12, 14 and 16 adhere in order to maximize channel utilization. The operation of the protocol requires a BIU 12, 14 or 16, when ready to transmit a packet to its data channel, to listen for signals on the bus 10 and, if none are present, it may begin transmission of the packet. However, due to the finite propagation time delay from one end of the bus to the other, there is a chance that two or more BIUs 12, 14 and 16 will begin transmitting packets simultaneously on the common data channel to which they are coupled. This results in a packet collision on the common channel forming part of bus 10 and diminishes the throughput capacity of that channel. If such a data collision occurs, all of the BIUs, 12, 14 and 16 need to be notified so that they can stop transmitting and wait a random time before attempting retransmission.

The integrally formed collision detectors 18 of the present invention perform the service of detecting a data collision and notifying the corresponding BIU, 12, 14 or 16 to stop transmitting and wait a random time before attempting retransmission.

Figure 2:
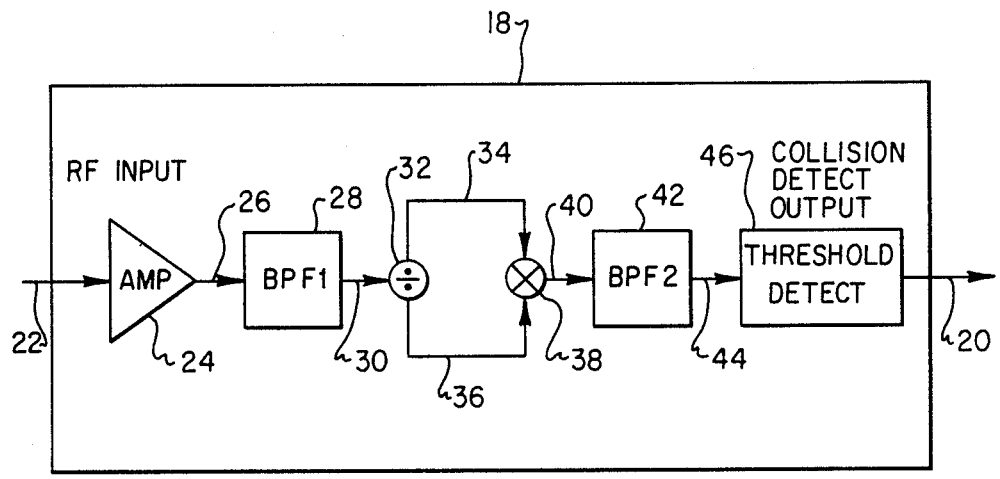
FIG. 2 is a schematic block diagram of the collision detector shown in FIG. 1 illustrating the details thereof.

FIG. 2 is a detailed schematic block diagram of the collision detector shown in FIG. 1. In FIG. 2, the input signals on line 22 are RF signals which normally reside on the common RF packet channel forming a part of the BCB 10 in FIG. 1. Amplifier 24 receives these signals and brings the signals up to a workable level. The output of amplifier 24 on line 26 is coupled to a first bandpass filter 28 which selects the common RF packet channel of interest and eliminates any interference from adjacent channels on the BCB 10. Thus, the bandpass of filter 28 represents a frequency spectrum which includes the data from one or more of the n signal transmitting devices or BIUs 12, 14 and 16 in FIG. 1.

The output of bandpass filter 28 on line 30 is coupled to a signal splitter 32 which generates signals on lines 34 and 36 to a device such as a conventional mixer 38 which multiplies the two signals on lines 34 and 36 together. These multiplied output signals on line 40 are coupled to a second bandpass filter 42. If only a single BIU is transmitting to the communication bus 10, the resulting output of mixer 38 is a signal component of a first frequency. If two or more different signals from two different BIUs are present at the collision detector apparatus 18 input on line 22, as there would be in the event of a packet collision, then the output of mixer 38 would contain at least a signal component having a second frequency which is shifted or removed from the first frequency. This is assuming, of course, that both signals are not identical and bit synchronous.

If bandpass filter 42 is designed to have a frequency bandpass that coincides with the signal component from mixer 38 that represents the second shifted frequency, then an output signal appears on line 44 from filter 42 and is coupled to threshold detector 46 which generates a collision detection signal output on line 20. If, however, the frequency of the output signal from mixer 38 on line 40 is that which is normally generated when only a single data signal is appearing on the common data communication channel in bus 10, then the bandpass of filter 42 is such that the signal generated on line 40 cannot pass through the filter 42. Thus, no detection signal is present on line 44 and no output from threshold detector 46 occurs on line 20.

Thus, when only one signal is present on the data comunication channel forming part of bus 10, and that frequency is divided and multiplied times itself by unit 38, a signal on line 40 has a particular spectral content which will not pass through filter 42 because of its bandpass design. Consider the following example of a single binary FM signal on the common data channel. A binary FM signal may be thought of as transmitting one of two frequencies, $f_1$ or $f_2$, depending upon the binary state of the modulator input. In such case, when the signal is split and multiplied by itself, the resulting output may then be expressed as:

$$V(t) = \frac{1}{2} + \sin(2ft)$$

where $f = f_1, f_2$. The frequency components present after the mixing, or multiplication, are D.C., and a signal at twice the fundamental component frequency or $2f_1$ and $2f_2$. If the second bandpass filter 42 has a bandpass centered around the difference frequency $f_2 - f_1$ with a bandwidth (which is not critical) of approximately the difference frequency $(f_2 - f_1)$, it is apparent that no significant signal energy will appear on line 44 to threshold detector 46. The effects of any small amounts of noise or signal energy transmitted by filter 42 can be eliminated by setting or adjusting the threshold level of detector 46.

However, if two signals appear simultaneously on the input line 22, then there is a difference in spectral content at the output of mixer 38 on line 40. The bandpass of filter 42 is designed for that spectral content and thus, generates a collision detection signal on line 44. Consider the example of two different source signals present simultaneously on the common data channel as there will be in the event of a packet collision. In such event, when the signal is split and mixed, or multiplied by itself, the output of mixer 38 on line 40 would contain, as frequency components, D.C., a signal twice the fundamental component frequencies, $2f_1$, $2f_2$ the sum, $f_1 + f_2$ and the difference frequency $f_2 - f_1$. The difference in frequency output of mixer 38 when one signal is present and when two signals are present is apparent. In this second case, the energy from the difference frequency $f_2 - f_1$ is readily passed through the second bandpass filter 42 because its bandpass is centered about the difference frequency $f_2 - f_1$. Thus, an output signal appears on line 44 to detector 46. Detector 46 generates a collision detection signal on line 20 which is used, as shown in FIG. 1, to notify the corresponding BIU to stop transmission.

This invention is capable of detecting collision garbled messages and therefore, the time taken up by interfering packets on the channel is minimized. Thus, the output signal of the collision detector requires the suspension of continued signal transmission from the active BIUs.

The present invention represents an effective solution to a difficult problem. Collision detection capability is added at minimum expense with simplified circuitry taking advantage of the RF circuitry normally found in a broadband BIU. The invention would be implemented at the location in a broadband bus 10 where the demodulation of the RF signal on the data channel takes place. One collision detection apparatus may be used to signal more than one BIU.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the apended claims.

We claim:

1. An apparatus including a data channel and multiple signal transmitting sources coupled to the data channel for transmitting fundamental FM data frequencies to the data channel, the transmitting sources having the possibility of transmitting their respective data simultaneously and causing unwanted data collisions, an improved collision detection apparatus including:
   a first bandpass filter coupled to the data channel to eliminate interference from any adjacent channel and for generating output frequency signals representing a bandpass frequency spectrum which includes the fundamental data frequency from more than one of the multiple signal transmitting means,
   frequency shifting means coupled to the first bandpass filter for receiving the output signals and shifting the frequency of the signals a first amount if only one fundamental signal is present on the data channel and at least a second amount if more than one fundamental signal is present on the data channel, wherein said frequency shifting means further includes:
   a signal splitter coupler to the output of the first bandpass filter for generating two substantially similar signals, and
   a mixer coupled to the two signal outputs of the splitter for multiplying the two signals together to generate an output having first shifted frequency components if only one fundamental signal is present on the data channel and second shifted frequency components if at least a second fundamental signal is also present on the data channel, and
   a second bandpass filter for generating a collision detecting output signal only when the frequency shifted a second amount is present so as to indicate a data collision.

2. Apparatus as in claim 1 wherein said mixer generates an output frequency including twice the fundamental frequency if only one signal is present on the data channel and generates output frequency components including the difference frequency if two fundamental signals are present on the data channel to cause a data collision.

3. Apparatus as in claim 2 wherein the second bandpass filter has a bandpass frequency spectrum including the difference frequency and excluding other frequency components to generate an output signal only if the difference frequency signals are present.

4. In a method of transmitting FM data on a data channel by multiple transmitting sources having the possibility of transmitting their respective fundamental data frequencies simultaneously and causing unwanted data collisions, an improved method for collision detection comprising the steps of:
   filtering the data on the channel with a first bandpass filter to eliminate interference from any adjacent channel and to generate output frequency signals representing a frequency spectrum which includes fundamental data frequencies from more than one of the multiple signal transmitting means,
   shifting the frequency of the first filter output signals a first amount if only one signal is present on the data channel, and at least a second amount if more than one frequency is present on the data channel,
   splitting the signal output of the first band pass filter to generate two substantially similar signals, and
   mixing the two substantially similar signals together to generate an output having first frequency shifted components if only one fundamental signal is present on the data channel, and second shifted frequency components if at least a second fundamental signal is also present on the data channel, and
   generating a collision detection signal only when the frequency shifted a second amount is present so as to indicate a data collision.

5. The improved method as in claim 4 further including the steps of:

generating an output frequency signal from the mixer including twice the fundamental frequency if only one signal is present on the data channel, and generating an output frequency signal from the mixer including the difference frequency and other signal components if two fundamental signal frequencies are present on the data channel to cause a data collision.

6. The improved method of claim 5 wherein the step of generating a collision detection signal further comprises the step of filtering the mixed signal with a bandpass filter having a bandpass frequency spectrum including the difference frequency but excluding the other signal components so as to generate a collision detection output signal only if mixer signals of the difference frequency are present.

7. An apparatus including a data channel and multiple signal transmitting sources coupled to the data channel for transmitting fundamental FM data frequencies to the data channel, the transmitting sources having the possibility of transmitting their respective data simultaneously and causing unwanted data collisions, an improved collision detection apparatus including:

means coupled to said data channel for splitting said transmitted signals into two substantially similar signals;

means coupled to said splitting means for mixing said similar signals to obtain a first frequency if only one fundamental signal is present on the data channel and at least a second frequency if more than one fundamental signal is present on the data channel; and means comprising a bandpass filter having a frequency spectrum including the second frequency and generating an output signal only if the second frequency is present, said means coupled to the mixing means for generating a collision detection signal.

8. Apparatus for the identification of data packet collisions occurring on a communications bus, comprising:

a plurality of bus interface units individually located at nodes of the communications bus for injecting and extracting data packets to and from the communications bus, and a plurality of collision detection means individually coupled to one of said bus interface units for receiving signals from the communications bus for an identified channel and generating a first output signal if only one signal is received from the communications bus and for producing a second signal when more than one signal is received, each of said collision detection means comprising:

a first band pass filter coupled to the communications bus and tuned to the identified channel for passing to a filter output the signal frequency intended to be present on the communications bus for the identified channel, frequency shifting means coupled to the filter output of said first band pass filter to shift the passed frequencies a first amount if only one frequency passes to the filter output and shifting the passed frequencies a second amount when more than one frequency passes to the filter output wherein said frequency shifting means includes a signal splitter coupled to the filter output of the first band pass filter for generating two substantially similar signals, and a mixer coupled to said signal splitter and receiving the two substantially similar signals for multiplication together to generate an output having first shifted frequency components if one frequency passes to the first band pass filter output and to generate a second output having shifted frequency components when more than one frequency passes to the first band pass filter output, and a second band pass filter connected to said frequency shifting means and tuned to block from passing to a detection means output a frequency shifted a first amount and for passing to the detection means output a frequency shifted a second amount to thereby indicate a packet collision.

* * * * *